United States Patent
Langley et al.

(10) Patent No.: US 8,015,155 B2
(45) Date of Patent: *Sep. 6, 2011

(54) NON-DISRUPTIVE BACKUP COPY IN A DATABASE ONLINE REORGANIZATION ENVIRONMENT

(75) Inventors: John Terry Langley, San Jose, CA (US); David Wayne Moore, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 429 days.

This patent is subject to a terminal disclaimer.

(21) Appl. No.: 12/197,220

(22) Filed: Aug. 22, 2008

(65) Prior Publication Data

US 2008/0313245 A1    Dec. 18, 2008

Related U.S. Application Data

(63) Continuation of application No. 11/280,655, filed on Nov. 15, 2005, now Pat. No. 7,433,902.

(51) Int. Cl.
*G06F 7/00* (2006.01)
(52) U.S. Cl. ........ 707/638; 707/607; 707/612; 707/614; 707/624; 707/634; 707/656; 707/659
(58) Field of Classification Search .......... 707/607, 707/612, 614, 624, 634, 638, 656, 659
See application file for complete search history.

(56) References Cited

U.S. PATENT DOCUMENTS

| | | | |
|---|---|---|---|
| 5,446,871 A | 8/1995 | Shomler et al. | |
| 5,875,479 A | 2/1999 | Blount et al. | |
| 6,035,412 A * | 3/2000 | Tamer et al. | 714/6.3 |
| 6,289,357 B1 | 9/2001 | Parker | |
| 6,324,692 B1 | 11/2001 | Fiske | |
| 6,366,987 B1 | 4/2002 | Tzelnic et al. | |
| 6,487,718 B1 | 11/2002 | Rodriguez et al. | |
| 6,502,205 B1 * | 12/2002 | Yanai et al. | 714/6.32 |
| 6,564,219 B1 | 5/2003 | Lee et al. | |
| 6,681,390 B2 | 1/2004 | Fiske | |
| 7,433,902 B2 * | 10/2008 | Langley et al. | 1/1 |

OTHER PUBLICATIONS

Murthy Devarakonda, Bill Kish, and May Mohindra, "Recovery in the Calypso File System", ACM Transactions on Computer Systems, Aug. 1996, pp. 287-310, vol. 14, No. 3, ACM.

Mark R. Brown, Karen N. Kolling, and Edward A. Taft, "The Alpine File System," ACM Transactions on Computer Systems, Nov. 1985, pp. 261-293, vol. 3, No. 4, ACM.

"IMS High Performance Reorganization Tools from IBM", [online] Copyright 2000, [retrieved on Jul. 1, 2005] Retrieved from the Internet: <URL: http://www-306.ibm.com/software/data/db2imstools/pdf/hpreorg.pdf>. 2 pages.

(Continued)

*Primary Examiner* — Etienne P LeRoux
*Assistant Examiner* — Bruce A Witzenburg
(74) *Attorney, Agent, or Firm* — Janet M. Skafer; Terrence J. Carroll

(57) ABSTRACT

Various embodiments of a computer system and computer program product backup a dataset. An input image copy of the dataset is read, wherein the input image copy is prior to a start of dataset reorganization. A cursor value associated with reorganization of said dataset is determined. A backup copy is produced based on the input image copy, the changes from the log and the cursor value.

20 Claims, 8 Drawing Sheets

OTHER PUBLICATIONS

"IBM Tivoli Storage Manager for HP-UX, Version 5.3, Administrator's Guide—Reorganizing the Database" [online] Dec. 2004 [retrieved on Nov. 12, 2005] Retrieved from the Internet: <URL: http://publib.boulder.ibm.com/infocenter/tivihelp/v1r1/topic/com.ibm.itsmhpn.doc/anrhgd53.pdf>. pp. 494-497.

"Online Processing, Part 3 in a series", [online] [retrieved on Sep. 27, 2005] Retrieved from the Internet: <URL: http://www.dbazine.com/ofinterest/oi-articles/ims3>. 31 pages.

Office Action for U.S. Appl. No. 10/280,655 mailed on Nov. 16, 2007 <26 pages>.

Examiner Interview Summary for U.S. Appl. No. 10/280,655 mailed on Feb. 20, 2008 <3 pages>.

Applicant Summary of Interview with Examiner for U.S. Appl. No. 10/280,655 submitted on Feb. 15, 2008 <2 pages>.

Applicant Summary of Interview with Examiner for U.S. Appl. No. 10/280,655 submitted on May 7, 2008 <2 pages>.

Notice of Allowance for U.S. Appl. No. 10/280,655 including Notice of Allowability and Examiner Interview Summary, mailed on May 30, 2008 <10 pages>.

\* cited by examiner

NON-DISRUPTIVE BACKUP COPY IN A DATABASE ONLINE REORGANIZATION ENVIRONMENT

This application is a continuation of prior application Ser. No. 11/280,655, filed Nov. 15, 2005. Application Ser. No. 11/280,655 is hereby incorporated by reference in its entirety.

BACKGROUND OF THE INVENTION 1.0 Field of the Invention

This invention relates to databases; and in particular, this invention relates to a non-disruptive backup copy in a database online reorganization environment.

2.0 Description of the Related Art

Databases allow a user to conveniently store and access data. Various databases store data in datasets. To allow data in a database to be recovered in the event of a failure, a database administrator periodically makes a backup copy of the dataset. The backup copy may also be referred to as an image copy. The backup copy may be a full image copy of the entire dataset, or an incremental image copy which comprises the differences in the dataset with respect to a previous backup copy. The previous backup copy may be a full image copy or another incremental image copy.

A dataset typically changes over time as data is added to, deleted from or updated in the dataset. Therefore, over time unused empty space forms among the data in the dataset because of the changes, and the dataset is referred to as being fragmented. Fragmentation typically degrades the performance of the database. For example, the amount of time to search for data in the dataset may increase. The database administrator typically uses a process referred to as reorganization to remove the empty space from the dataset. Reorganization may be performed while the dataset is online, that is, while users can access and change the dataset.

One database management system does not allow image copies to be created for datasets undergoing Online Reorganization (OLR) until OLR is complete. Therefore, there is a need for a technique which allows a backup copy of a dataset to be created while that dataset is undergoing online reorganization.

SUMMARY OF THE INVENTION

To overcome the limitations in the prior art described above, and to overcome other limitations that will become apparent upon reading and understanding the present specification, various embodiments of a computer system and computer program product backup a dataset. An input image copy of the dataset is read, wherein the input image copy is prior to a start of dataset reorganization. A cursor value associated with reorganization of said dataset is determined. A backup copy is produced based on the input image copy, the changes from the log and the cursor value.

In another embodiment, a computer system is provided to backup a dataset. A cursor indicates a state of reorganization. A backup copy of the dataset comprises the cursor, a first area and a second area. The first area comprises one or more blocks to reconstruct a target image copy of the dataset undergoing reorganization based on the cursor, and the second area comprises one or more blocks to reconstruct a source image copy of the dataset undergoing reorganization based on the cursor.

In this way, various embodiments of a technique are provided which create a non disruptive backup copy of a dataset while that dataset is undergoing online reorganization.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

Figure 1:
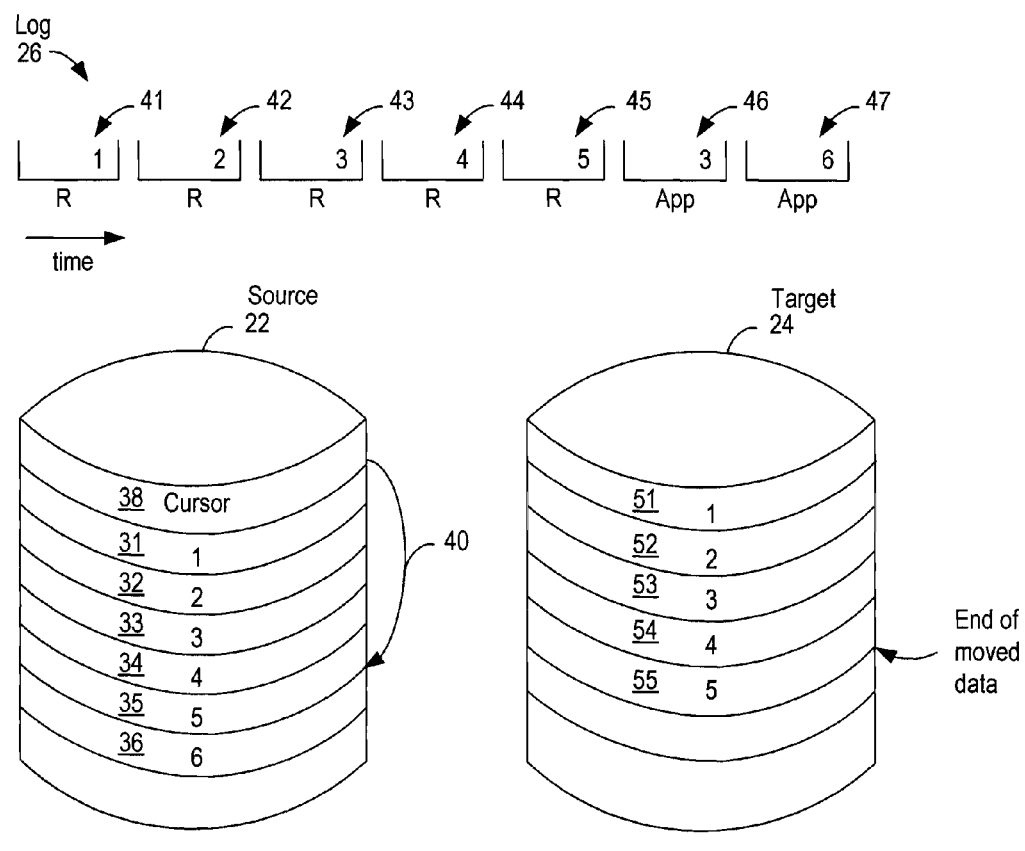
FIG. 1 depicts an illustrative diagram of a source dataset and a target dataset in the process of reorganization and an associated log.

After considering the following description, those skilled in the art will clearly realize that the teachings of the various embodiments of the present invention can be utilized to create a backup copy of a dataset while that dataset is undergoing online reorganization. Various embodiments of a computer-implemented method, system and computer program product backup a dataset. An input image copy of the dataset is read, wherein the input image copy is prior to a start of dataset reorganization. A cursor value associated with reorganization of said dataset is determined. A backup copy is produced based on the input image copy, the changes from the log and the cursor value.

In another embodiment, a computer system is provided to backup a dataset. A cursor indicates a state of reorganization. A backup copy of the dataset comprises the cursor, a first area and a second area. The first area comprises one or more blocks to reconstruct a target image copy of the dataset undergoing reorganization, and the second area comprises one or more blocks to reconstruct a source image copy of the dataset undergoing reorganization based on the cursor.

One database management system, also referred to as a database, does not allow image copies to be registered for datasets undergoing Online Reorganization (OLR) until OLR is complete. For example, in the IBM® (Registered trademark of International Business Machines Corporation) IMS™ (Trademark of International Business Machines Corporation) database, OLR was designed to avoid interruptions to the accessing of datasets by applications. One reason for not allowing image copies to be registered for datasets undergoing online reorganization is that the conventional image copy process reads from a source dataset and needs to have a stable point at which the switch occurs from the source to a target dataset. In the IMS database, OLR maintains a cursor which acts as a pointer which indicates those blocks which have been reorganized and those blocks which have not yet been reorganized. The blocks are associated with block numbers, and OLR reorganizes the blocks sequentially in accordance with their block numbers, starting with block one. The cursor contains a value indicating the most recent block which was reorganized, that is, moved, to the target dataset. Therefore, as blocks are moved to the target dataset, the value of the cursor changes. Having a stable cursor would disrupt OLR, in addition to other processes, and also would prevent OLR, and other processes, from accessing the dataset while the image copy process is in progress. During OLR, the data of a single dataset is spread across the source dataset and the target dataset. Another reason for not allowing image copies to be registered for datasets undergoing OLR in the IMS database is that the conventional IMS database does provide a mechanism or recovery depository control (RECON) record structure for registering multiple dataset image copies in the RECON record structure which are associated with a single database dataset. Therefore, the RECON structure cannot register the source and target dataset of reorganization.

Various embodiments of the present invention provide a backup copy of a dataset undergoing reorganization without accessing that dataset; therefore, the operation of the dataset in the production environment and OLR are not disrupted. In various embodiments, the backup copy of the dataset is created based on a prior backup copy and an archive log dataset, and in some embodiments, one or more change accumulation datasets. Various embodiments process the blocks in the prior backup copy and in the log records, and in some embodiments, the records in a change accumulation dataset, based on a specific cursor value to provide a distinct switch point.

FIG. 1 depicts an illustrative diagram of a dataset as it is undergoing reorganization. During reorganization, the dataset is referred to as a source dataset 22 and the reorganized dataset is referred to as a target dataset 24. The reorganization process causes a log 26 to be updated with log records indicating the movement of blocks from the source dataset 22 to the target dataset 24. In this example, prior to reorganization, the source dataset 22 has blocks 31, 32, 33, 34, 35 and 36, with block numbers, 1, 2, 3, 4, 5, and 6, respectively. In various embodiments, a block comprises hierarchical data of a hierarchical database. In some embodiments, the contents of a block are mapped by freespace pointers for unused areas and segment descriptions of hierarchical data. During reorganization the source dataset 22 also contains a cursor 38. The cursor 38 references the most recent block which has been moved by OLR from the source dataset 22 to the target dataset 24. In this example, the cursor 38 has a value of five and points to the end of block five, illustrated by arrow 40.

The log 26 may also be referred to as an archive log. The log 26 comprises log records 41, 42, 43, 44, 45, 46 and 47. Log records 41-45 are generated in response to OLR as blocks 1-5, respectively, are moved from the source dataset 22 to the target dataset 24, and an "R" indicates that the log record is an OLR log record. The OLR log records contain a cursor representing the current state of OLR in addition to the block number and block data. In various embodiments, the log records also contain a relative offset to access the block data. In this example, blocks one through five have been moved to the target dataset 24. At this point in the log 26, the cursor has a value of five. In online reorganization, all updates to blocks prior to and including the cursor in the last OLR update block are made to the target dataset; and, all updates to blocks after the cursor are made to the source dataset. Continuing the example, the target dataset 24 comprises blocks one through five, 51 through 55, respectively, and the cursor 42 of the source dataset 22 points to block five 35. An application then changed the data in block three; in OLR, because the cursor points to block five and because three is less than the cursor value of five, block three is updated in the target dataset 24. In the log 26, a log record 46 indicates the change to block three by an application, and the term "App" is used to indicate that log record 46 was generated in response to the application. Next, the application changed data in block six. Because six is greater than the cursor value of five, block six has not yet been moved to the target dataset 24. Therefore, during OLR, block six is updated in the source dataset 22, and log record 47 is generated in response to that update.

Figure 2:
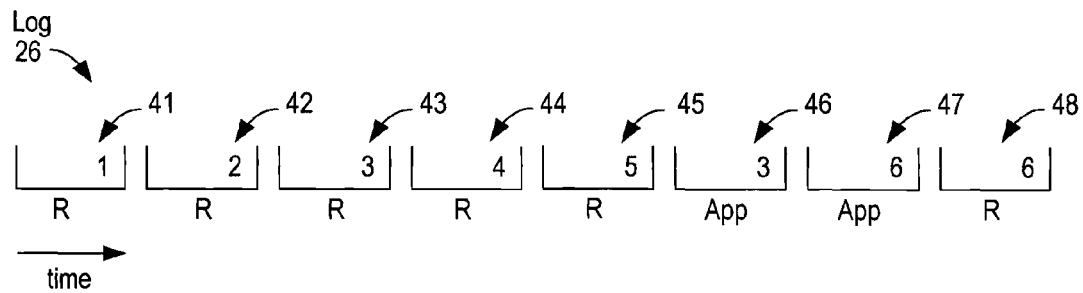
FIG. 2 depicts an illustrative diagram of the movement of block six of the dataset of FIG. 1 from the source dataset to the target dataset during reorganization.
Figure 2:
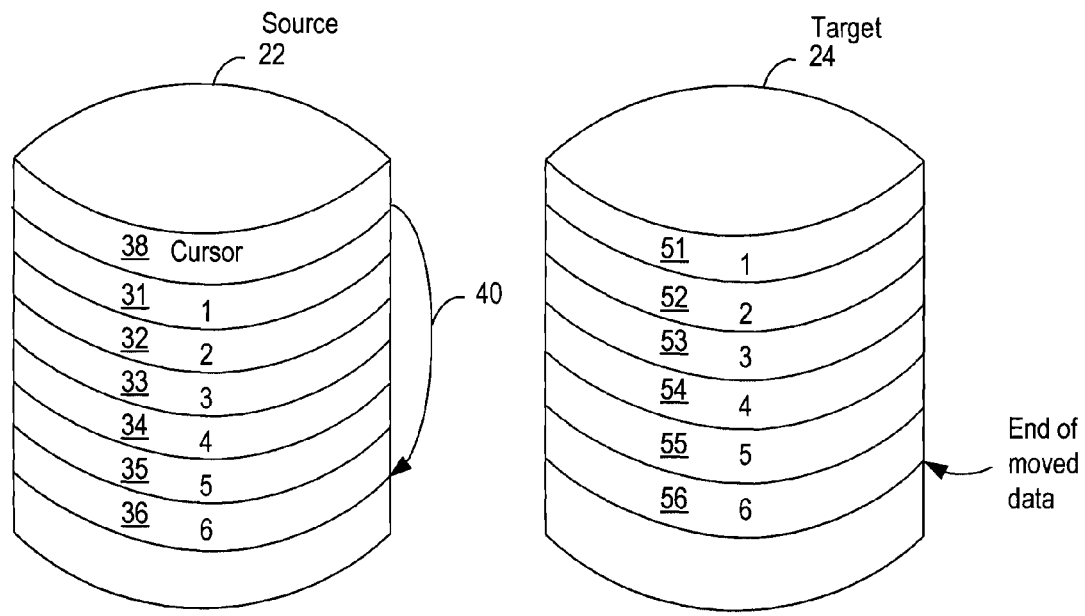

FIG. 2 depicts an illustrative diagram of the movement of block six from the source dataset 22 of FIG. 2 to the target dataset during reorganization. In response to OLR moving block six 36 of the source dataset 22 to the target dataset 24 in block six 56, the cursor 38 is updated to a value of six as indicated by arrow 40, and log record 48 is generated based on the movement of block six to the target dataset 24 by OLR.

Figure 3:
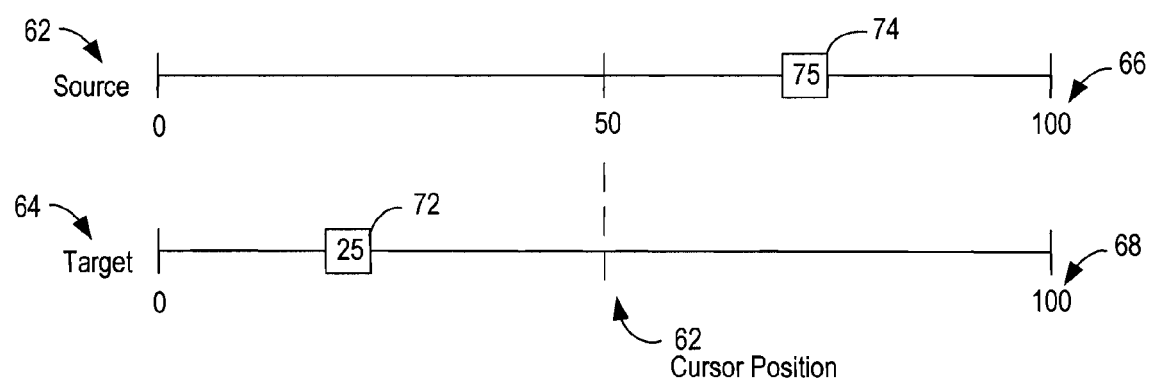
FIG. 3 depicts an illustrative diagram of the cursor position in a source dataset and a target dataset.

FIG. 3 depicts a diagram illustrating the cursor position in a source dataset and a target dataset during reorganization. The first line 62 represents an OLR source dataset, and the second line 64 represents an OLR target dataset. The source dataset has one hundred blocks 66, and target dataset will have the one hundred blocks 68 of the source dataset when reorganization is complete. The cursor 62 points to block fifty. For example, if a change comes in for block twenty-five, that change is written to block twenty-five 72 of the OLR target because the value twenty-five is less than or equal to the cursor value of fifty. In another example, if a change comes in for dataset block seventy-five, that change is written to the source dataset block seventy-five 74 because the value seventy-five is greater than the cursor value of fifty.

Figure 4:
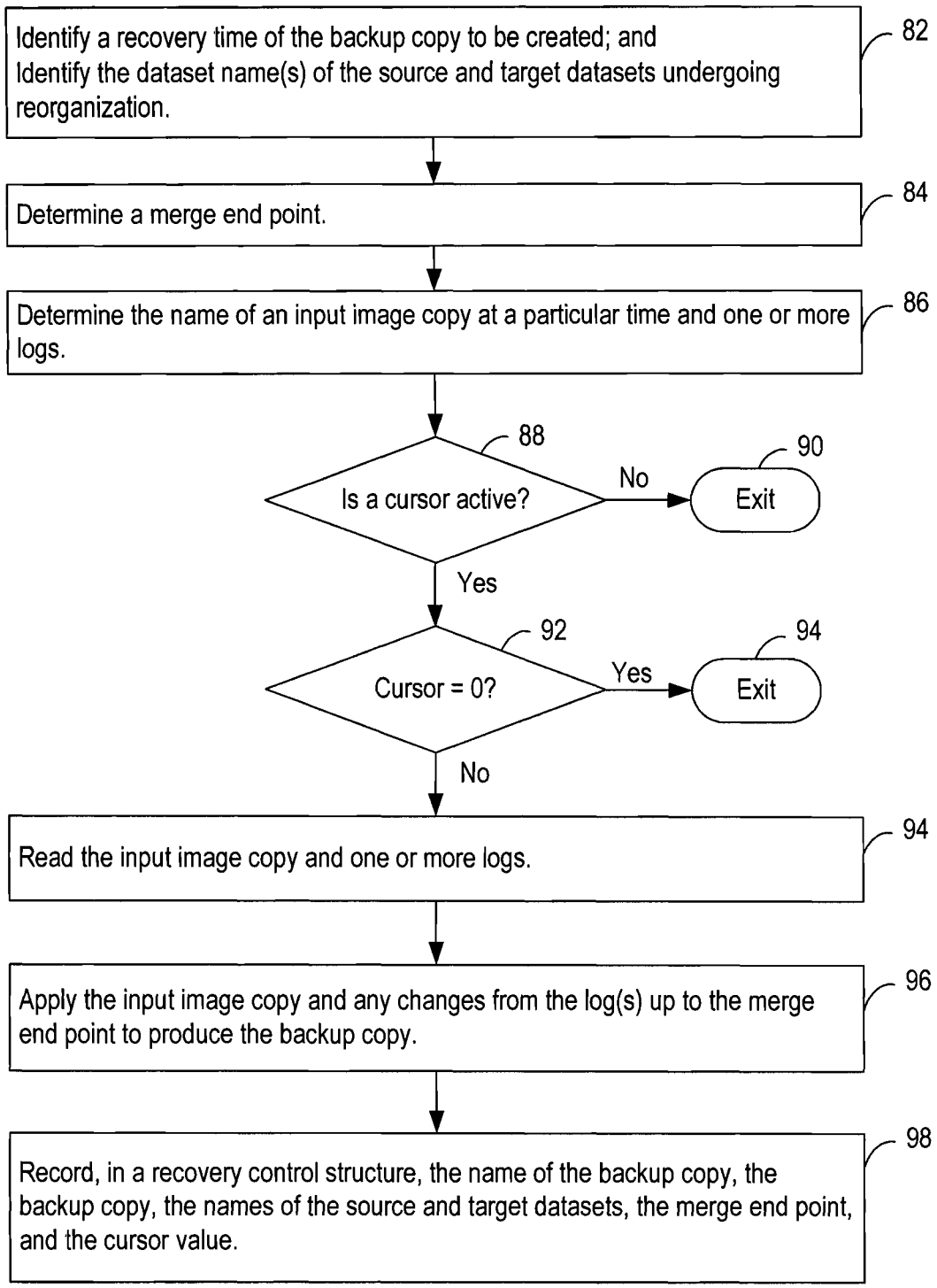
FIG. 4 depicts a flowchart of an embodiment of creating a backup copy of a dataset which is undergoing reorganization.

FIG. 4 depicts a flowchart of an embodiment of creating a backup copy of a dataset which is undergoing reorganization. In various embodiments, the flowchart of FIG. 4 is implemented in a backup tool.

In step 82, a recovery time of the backup copy that is to be created is identified, and the dataset names of the source and target datasets undergoing reorganization are identified. In various embodiments, the recovery time is a timestamp which is provided is provided by the database administrator; in other embodiments, the recovery time defaults to the current time. In some embodiments, the user specifies the name of the source dataset, and the backup tool determines the name of the target dataset based on the name of the source dataset.

In step 84, a merge end point is determined for the source dataset. The merge end point is a time of the most recent archive log boundary of the sharing database systems prior to the recovery time for the source dataset. The merge end point is the most recent of the following for the source dataset: (1) the most recent log end time, and (2) the most recent archive log end time.

In step 86, the name of an input image copy at a particular time, and one or more logs are determined. In various embodiments, a user provides the name of an input image copy. In other embodiments, the backup tool automatically determines the name of an input image copy based on the specified source dataset. In various embodiments, backup tool selects a most recent image copy of the source dataset prior to the recovery time. In some embodiments, the input image copy is selected based on the merge end point; the input image copy is the most recent image copy of the source dataset prior to the merge end point.

Step 88 determines whether an active cursor is associated with the source dataset. If not, in step 90, the flowchart exits because no reorganization is in progress and conventional backup techniques may be used. In response to step 88 determining that a cursor is active, the source dataset is undergoing reorganization. Step 92 determines whether the cursor is equal to zero. If so, in step 94, the flowchart exits because reorganization is complete and conventional backup techniques may be used.

In response to step 92 determining that the cursor is not equal to zero, the source dataset is undergoing reorganization, and, in step 94, the input image copy and one or more logs are read. In various embodiments, the backup copy is initialized with the information from the input image copy. Alternately, the input image copy is selected by a user. The backup copy run time is the time used to start applying log records for recovery or subsequent backup copy creation. All log records prior to the backup copy run time have been applied to the input image copy so only data subsequent to the backup copy run time of the input image copy needs to be processed.

In step 96, the input image copy and log(s) up to the merge end point are applied to produce the backup copy. The merge end point is a time at which the processing of log records is stopped. The merge end point becomes the backup copy run time. In various embodiments, the blocks from the input image copy which have block numbers greater than the cursor value are applied to a source area of the backup copy. The log(s) is (are) then processed. Any changes in the log(s) to the target dataset up to, and including, the cursor are applied to a target-area of the backup copy, and changes in the log(s) to the source dataset after the cursor are applied to the source area of the backup copy. In particular, for a cursor value of cv, log records associated with blocks 1 and up to, and including block cv are applied to the target area of the backup copy, and log records associated with blocks beyond block cv are applied to the source area of the backup copy. Therefore, the target area of the backup copy will contain blocks 1 through cv of the target dataset, and the source area will contain blocks beyond block cv of the source dataset. In some embodiments, the log records starting from the time that the input image copy was created up to the merge end point, are applied to the input image copy of the dataset to provide the backup copy.

In some embodiments, the merge end point is not used, step 84 is omitted, and a log end time is used rather than the merge end point.

In step 98, the backup copy, the name of the backup copy, the backup copy, the names of the source and target datasets and the merge end point are recorded in the recovery control structure. In some embodiments, the recovery control structure is a dataset. After the backup copy is made, the backup copy is registered in the recovery control structure (RECON), and is usable as input to recovery in a database recovery facility (DRF) to recover both the source and target datasets or to recover either the source or the target dataset.

In this way a single backup image copy of a dataset which comprises data to reconstruct the source and target datasets of reorganization is provided.

In another embodiment, the log is a change accumulation dataset. In yet another embodiment, the logs comprise at least one archive log and at least one change accumulation dataset.

Figure 5:
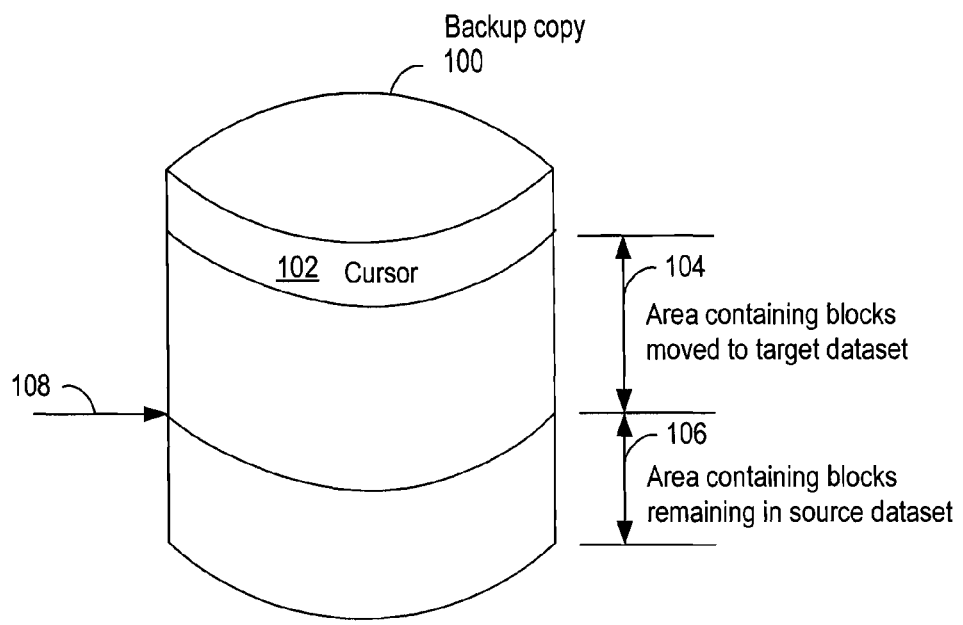
FIG. 5 illustrates an embodiment of an backup copy of a dataset undergoing reorganization.

FIG. 5 depicts an embodiment of a backup copy 100 of the dataset which is being reorganized produced using an embodiment of the flowchart of FIG. 4. The backup copy 100 comprises a cursor 102, a first area 104 and a second area 106. The first area 104 and second area 106 are defined by the cursor 102. The first area 104 comprises one or more blocks which have been moved to the target data. The first area 104 is typically defragmented. The second area 106 comprises one or more blocks associated with the source dataset for those blocks after the cursor 102. The second area 106 may be fragmented. The arrow 108 indicates the boundary between the first area 104 and the second area 106 as defined by the cursor 102.

Figure 6:
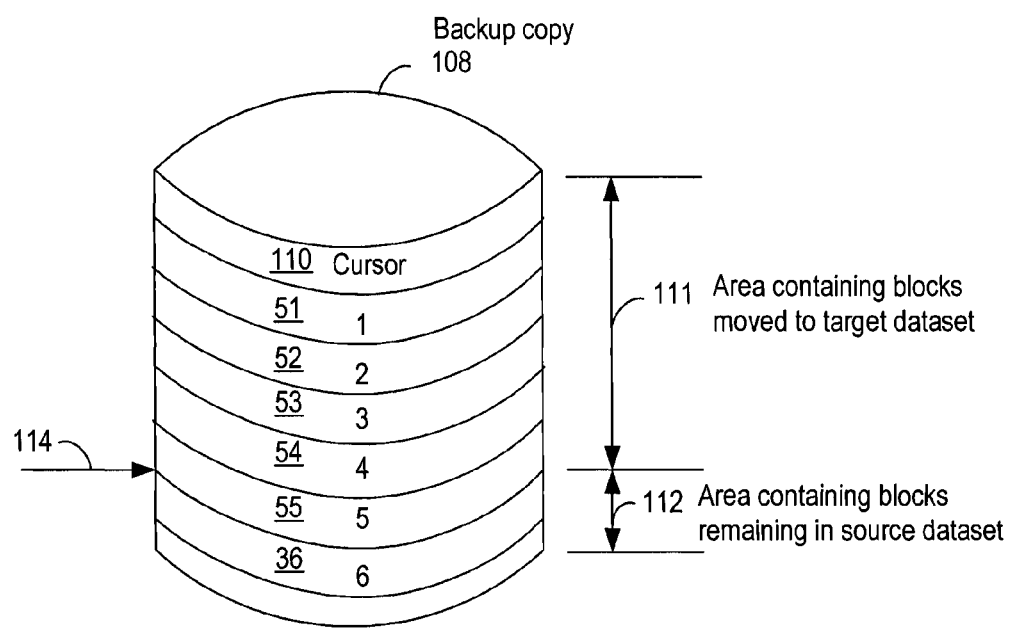
FIG. 6 illustrates an exemplary backup copy of the exemplary dataset of FIG. 1 which is undergoing reorganization.

FIG. 6 depicts an illustrative backup copy 108 of the exemplary dataset of FIG. 1. The backup copy 108 comprises a cursor 110, a first area 111 and a second area 112. The first area 111 comprises block one 51 through block five 55. The blocks in the first area 111 will typically be defragmented. The second area 112 comprises block six 36. The blocks in the second area 112 are typically not defragmented. In this example, the cursor 110 is equal to five. As indicated by arrow 114, the cursor 110 points to block five.

Figure 7:
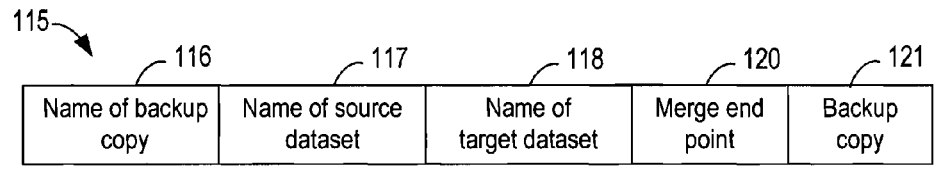
FIG. 7 depicts an embodiment of a recovery control structure.

FIG. 7 depicts an embodiment of a recovery control structure 115. The recovery control structure 115 comprises the name of the backup copy 116, the name of the source dataset 117, the name of the target dataset 118, the merge end point 120 and the backup copy 121.

Figure 8:
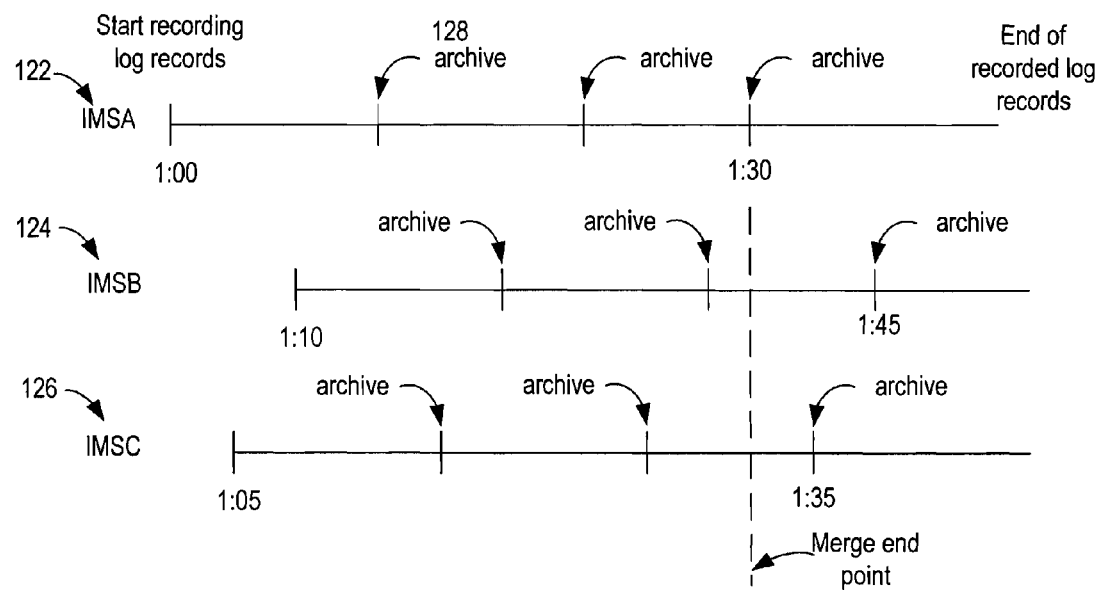
FIG. 8 depicts an diagram illustrating the selection of a merge end point.

FIG. 8 depicts an illustrative diagram of the merge end point of a plurality of logs 122, 124 and 126. Three IMS subsystems, IMSA, IMSB and IMSC, are accessing the source dataset, and each IMS subsystem is associated with a log 122, 124 and 126, respectively. The start of recording log records is at 1:00 for IMSA, the start of recording log records for IMSB is at 1:10, and the start of recording log records for IMSC is at 1:05. Archiving is performed for the logs at predetermined intervals as illustrated by the arrows labeled "archive" 128. The merge end point is equal to the most recent of: (1) the most recent long end time, and (2) the most recent archive log end time. In this example, the recovery time is selected as 1:32; therefore, the merge end point is equal to the archive log time of 1:30 of the IMSA subsystem. The archive of 1:45 for IMSB and archive of 1:35 for IMSC will not be merged. The merge end point occurs prior to or at the recovery time.

Figure 9:
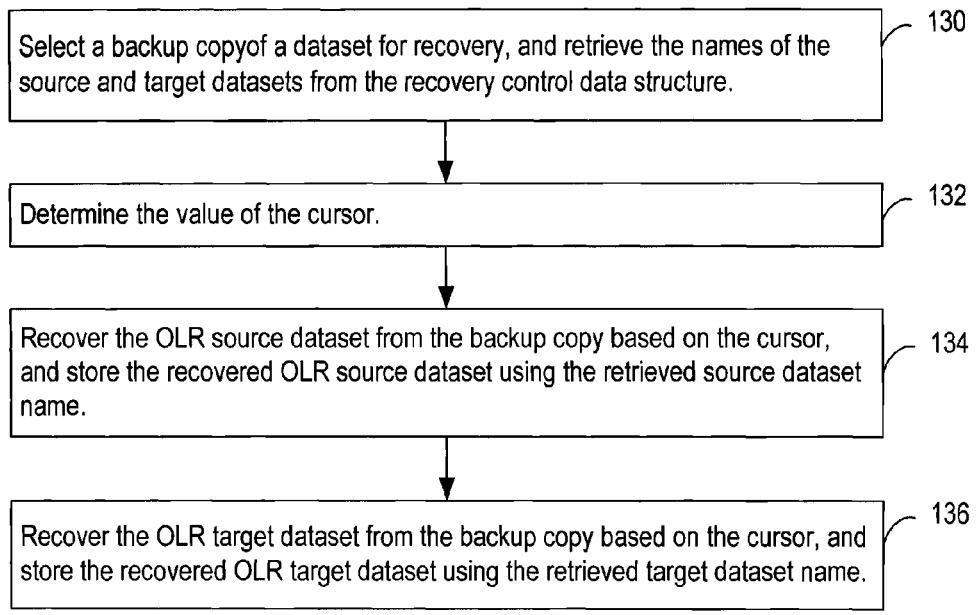
FIG. 9 depicts a flowchart of an embodiment of recovering a source dataset and a target dataset which are undergoing reorganization.

FIG. 9 depicts a flowchart of an embodiment of recovering a source dataset and a target dataset which was undergoing reorganization. In some embodiments, the flowchart of FIG. 9 is implemented in a recovery tool. In other embodiments, the flowchart of FIG. 9 is implemented in the backup tool. In step 130, a dataset is selected for recovery. In various embodiments, a user selects the dataset to recover, alternately, the computer system may select a dataset to recover. The names of the source and target datasets are retrieved from the recovery control data structure. In some embodiments, the selected dataset name is used as the source dataset name.

In step 132, the value of the cursor is determined. The cursor value is retrieved from the cursor stored in the backup copy.

In step 134, the OLR source dataset is recovered, that is, reconstructed, from the backup copy based on the cursor and stored using the retrieved source dataset name. The cursor value is stored in the source dataset. The blocks starting at the block following the cursor value to the ending block are written to the source dataset to recover the source dataset.

In step 136, the OLR target dataset is recovered from the backup copy based on the cursor, and stored using the retrieved target dataset name. Blocks 1 through the block associated with the cursor value are written to the target dataset to recover the target dataset. In this way, the source and target dataset are recovered with the information needed to complete reorganization. Blocks 1 to the cursor value (cv) of the source dataset have been copied to the target dataset and are no longer needed in the source dataset. In this way, the source and target datasets are recovered in a single pass using the backup copy.

In an alternate embodiment, the recovery tool performs steps 132 and 134 to recover the source dataset, without recovering the target dataset. In yet another embodiment, the recovery tool performs steps 132 and 136 to recover the target dataset, without recovering the source dataset. Therefore, in the alternate embodiment, the source and target datasets are recovered in two passes of the backup copy.

Figure 10:
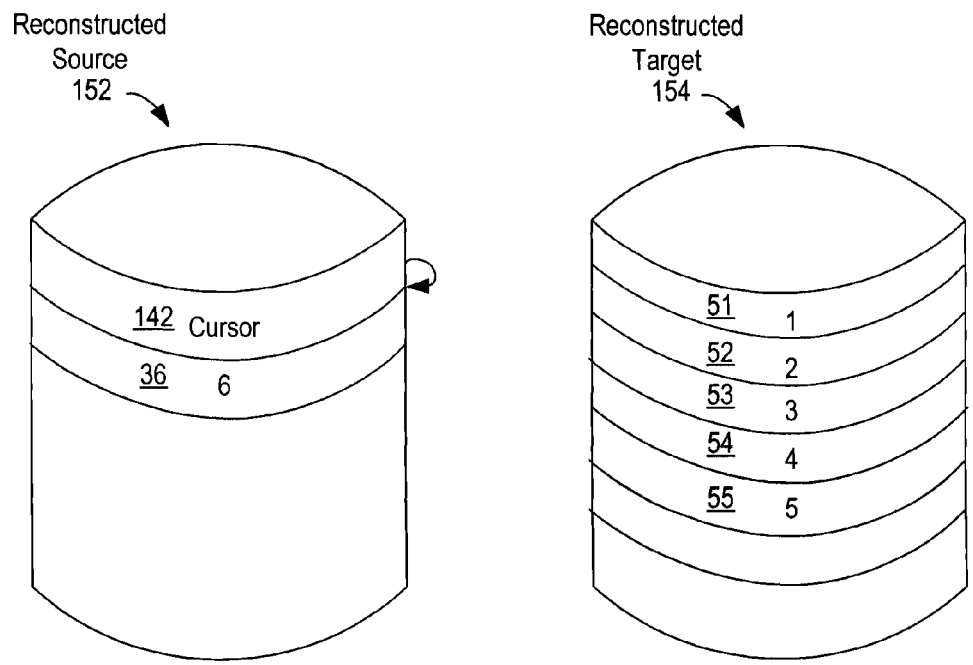
FIG. 10 illustrates an exemplary reconstructed source dataset and a reconstructed target dataset which were recovered using the flowchart of FIG. 9.

FIG. 10 depicts an illustrative reconstructed source dataset 152 and an illustrative reconstructed reorganization target dataset 154 after recovery using the illustrative backup copy of FIG. 6. The reconstructed source dataset 152 comprises the cursor 142 which in this example has a value of five, and any blocks from the backup dataset after the cursor, in this example, block six 36. The reconstructed source dataset 152 typically is not defragmented. The reconstructed target dataset 154 comprises those blocks up to the cursor value of five, in this example, blocks one through five, 51 through 55, respectively. The reconstructed target dataset 154 is typically defragmented. The reconstructed source dataset does not contain the blocks which have been moved to the reconstructed target and does not exactly match the original source dataset of FIG. 2. However, those missing blocks of the reconstructed source dataset are not needed to proceed with the reorganization, and the remaining blocks are sufficient to complete reorganization.

Figure 11:
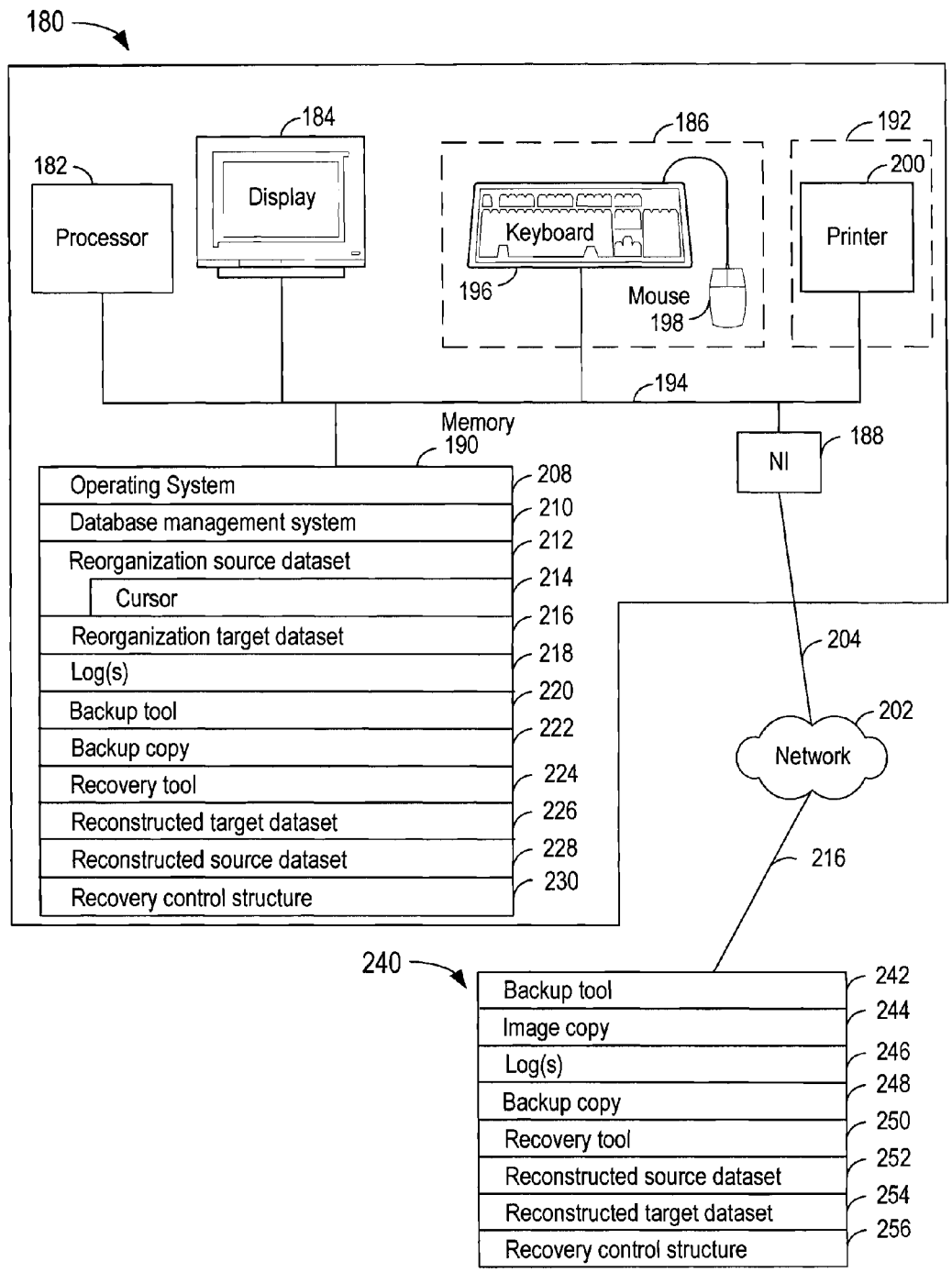
FIG. 11 depicts an illustrative computer system which uses various embodiments of the present invention.

FIG. 11 depicts an illustrative computer system 180 which uses various embodiments of the present invention. The computer system 180 comprises a processor 182, display 184, input interfaces (I/F) 186, communications interface 188, memory 190 and output interface(s) 192, all conventionally coupled, directly or indirectly, by one or more buses 194. The input interfaces 186 comprise at least one of a keyboard 196 and a pointing device such as a mouse 198. The output interface 192 comprises a printer 200. The communications interface 188 is a network interface (NI) that allows the computer 180 to communicate via a network 202, such as the Internet. The communications interface 188 may be coupled to a transmission medium 204 such as a network transmission line, for example twisted pair, coaxial cable or fiber optic cable. In another embodiment, the communications interface 188 provides a wireless interface, that is, the communications interface 188 uses a wireless transmission medium.

The memory 190 generally comprises different modalities, illustratively volatile memory such as semiconductor memory, such as random access memory (RAM), and persistent or non-volatile memory, such as, disk drives. In some embodiments, the memory comprises local memory which is employed during execution of the program code, bulk storage, and one or more cache memories which provide temporary storage of at least some program code in order to reduce the number of times that code is retrieved from bulk storage during execution. In various embodiments, the memory 190 stores an operating system 208 and a database management system 210, a reorganization source dataset 212 with a cursor 214, a reorganization target dataset 216, one or more logs 218, a backup tool 220, a backup copy 222, a recovery tool 224, a reconstructed source dataset 226, a reconstructed target dataset 228, and a recovery control structure 230. In some embodiments, the backup tool 220 and the recovery tool 224 are combined.

In various embodiments, the specific software instructions, data structures and data that implement various embodiments of the present invention are typically incorporated in the backup tool 220, the recovery tool 224, and the backup copy 222. Generally, an embodiment of the present invention is tangibly embodied in a computer-readable medium, for example, the memory 190 and is comprised of instructions which, when executed by the processor 182, causes the computer system 180 to utilize the present invention. In various embodiments, the memory 190 may store the software instructions, data structures and data for any of the operating system 208, the database management system 210, the reorganization source dataset 212 with the cursor 214, the reorganization target dataset 216, one or more logs 218, the backup tool 220, the backup copy 222, the recovery tool 224, the reconstructed source dataset 226 and the reconstructed target dataset 228, in semiconductor memory, in disk memory, or a combination thereof.

The operating system 208 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the database management system 210 is the IBM IMS database management system. However, the invention is not meant to be limited to the IBM IMS database management system and other database management systems may be used.

In another embodiment, the backup copy is generated on a computer system 240 which is different from the mission-critical computer system containing the source and target datasets, for example, computer system 180. In some embodiments, a backup copy is created on a computer system at a remote site at a different location from the mission-critical computer system. Therefore, the performance of the mission-critical computer system is not affected by the generation of a backup copy. In various embodiments, the computer system 240 communicates with computer system 180 via a transmission medium 216 to the network 202. In some embodiments, the computer system 240 comprises a backup tool 242, an image copy 244, one or more logs 246, a backup copy 248, a recovery tool 250, a reconstructed source dataset 252 and a reconstructed target dataset 254, and a recovery control structure 256.

In various embodiments, the present invention may be implemented as a method, apparatus, computer program product or article of manufacture using standard programming and/or engineering techniques to produce software, firmware, hardware, or any combination thereof. Various embodiments of the invention are implemented in software, which includes and is not limited to firmware, resident software, and microcode.

Furthermore various embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus or device.

The medium can be an electronic, magnetic, optical, electromagnetic, or semiconductor system (or apparatus or device). Examples of a computer-readable medium comprise a semiconductor or solid state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and digital video disk (DVD). In addition, the software in which various embodiments are implemented may be accessible through the transmission medium, for example, from a server over the network. Those skilled in the art will recognize that many modifications may be made to this configuration without departing from the scope of the present invention.

The exemplary computer system illustrated in FIG. 11 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer program product for backing up a dataset comprising a first plurality of blocks, said computer program product comprising:
    a computer readable medium;
    first program instructions to read an input image copy of said dataset, wherein said input image copy is prior to a start of a reorganization of said dataset;
    second program instructions to determine a cursor value of a cursor associated with reorganization of said dataset, said dataset being a source dataset, said cursor value indicating a second plurality of blocks of said first plurality of blocks that have been moved from said source dataset to said target dataset, wherein said second plurality of blocks is a subset of said first plurality of blocks;
    third program instructions to produce a backup copy of said dataset based on said input image copy, a log comprising changes to said dataset, and said cursor value; said backup copy comprising said cursor, said second plurality of blocks, and blocks of said first plurality of blocks that have not been moved to said target dataset; and
    wherein said first, second and third program instructions are stored on said computer readable medium.

2. The computer program product of claim 1 wherein the third program instructions to produce said backup copy applies blocks from said input image copy and changes from said log to said backup copy based on said cursor value.

3. The computer program product of claim 1 further comprising:
    fourth program instructions to reorganize said dataset, wherein said cursor value is associated with said reorganization, whereby said reorganization is not disrupted;
    wherein said fourth program instructions are stored on said computer readable medium.

4. The computer program product of claim 1 wherein said backup copy of said dataset comprises said cursor, a first area and a second area, said first area comprising said second plurality of blocks, and said second area comprising said blocks of said first plurality of blocks that have not been moved to said target dataset.

5. The computer program product of claim 1 further comprising:
    fourth program instructions to identify said input image copy;
    wherein said fourth program instructions are stored on said computer readable medium.

6. The computer program product of claim 4 wherein said third program instructions to produce said backup copy applies a change from said log that is for a block having a position less than said cursor value to said first area of said backup copy, and applies a change from said log that is for a block having a position greater than said cursor value to said second area of said backup copy.

7. The computer program product of claim 1 further comprising:
    fourth program instructions to record in a recovery control structure a name of said backup copy;
    wherein said fourth program instructions are stored on said computer readable medium.

8. The computer program product of claim 1 further comprising:
    fourth program instructions to record in a recovery control structure a name of said backup copy, a merge end point, a name of said dataset, and a name of said target dataset;
    wherein said fourth program instructions are stored on said computer readable medium.

9. The computer program product of claim 1 further comprising:
    fourth program instructions to reconstruct a reorganization source dataset based on said backup copy and said cursor value;
    wherein said fourth program instructions are stored on said computer readable medium.

10. The computer program product of claim 1 further comprising:
    fourth program instructions to reconstruct said target dataset based on said backup copy and said cursor value;
    wherein said fourth program instructions are stored on said computer readable medium.

11. The computer program product of claim 1 further comprising:
    fourth program instructions to reconstruct a reorganization source dataset and said target dataset based on said backup copy and said cursor value;
    wherein said fourth program instructions are stored on said computer readable medium.

12. A computer system for backing up a dataset comprising a first plurality of blocks, comprising:
    a processor; and
    a memory storing a plurality of instructions executable by said processor, said plurality of instructions comprising instructions for:
        reading an input image copy of said dataset, wherein said input image copy is prior to a start of reorganizing said dataset;
        determining a cursor value of a cursor associated with reorganization of said dataset, said dataset being a source dataset, said cursor value indicating a second plurality of blocks of said first plurality of blocks that have been moved from said source dataset to a target dataset, wherein said second plurality of blocks is a subset of said first plurality of blocks; and producing a backup copy of said dataset based on said input image copy, a log comprising changes to said dataset, and said cursor value; said backup copy comprising said cursor, said second plurality of blocks, and blocks of said first plurality of blocks that have not been moved to said target dataset.

13. The computer system of claim 12 wherein said producing comprises applying blocks from said input image copy and changes from said log to said backup copy based on said cursor value.

14. The computer system of claim 12, said memory further comprising instructions for:
reorganizing said dataset, wherein said cursor value is associated with said reorganizing, whereby said reorganizing is not disrupted.

15. The computer system of claim 12 wherein said backup copy of said dataset comprises said cursor, a first area and a second area, said first area comprising said second plurality of blocks, and said second area comprising said blocks of said first plurality of blocks that have not been moved to said target dataset.

16. The computer system of claim 12, said memory further comprising instructions for:
identifying said input image copy.

17. The computer system of claim 15 wherein said producing comprises applying a change from said log that is for a block having a position less than said cursor value to said first area of said backup copy, and applying a change from said log that is for a block having a position greater than said cursor value to said second area of said backup copy.

18. The computer system of claim 12, said memory further comprising instructions for:
recording in a recovery control structure a name of said backup copy.

19. The computer system of claim 12, said memory further comprising instructions for:
reconstructing a reorganization source dataset based on said backup copy and said cursor value.

20. The computer system of claim 12, said memory further comprising instructions for:
reconstructing said target dataset based on said backup copy and said cursor value.

\* \* \* \* \*